Dec. 17, 1968    L. M. PALMER    3,417,313
TWO-CORE SOLID STATE VOLTAGE INVERTER SYSTEMS
Filed Sept. 21, 1966

INVENTOR.
Lawrence M. Palmer

BY

ATTY'S.

United States Patent Office 3,417,313
Patented Dec. 17, 1968

3,417,313
TWO-CORE SOLID STATE VOLTAGE INVERTER SYSTEMS
Lawrence M. Palmer, Scottsdale, Ariz., assignor to Motorola, Inc., Franklin Park, Ill., a corporation of Illinois
Filed Sept. 21, 1966, Ser. No. 580,944
2 Claims. (Cl. 321—18)

ABSTRACT OF THE DISCLOSURE

A two-core inverter circuit wherein feedback from an output linear-core transformer to a saturable-core transformer includes both voltage and current feedback. Transistor devices are utilized as switching units in the circuit. In one circuit configuration, voltage feedback is applied directly to the base control electrodes of the transistors rather than through a separate winding on the saturable transformer. In another circuit configuration the voltage feedback is impressed across the control electrodes through windings on the saturable-core transformer.

This invention relates generally to DC to AC inverters and more particularly to those inverters utilizing saturable magnetic core devices and linear transformer devices.

In operating certain types of electrical devices, such as gaseous discharge type of lighting fixtures, including fluorescent lights, electric heating blankets and the like, for obtaining operational and constructional advantages, it is desirable to power the device with a high frequency current. For example in fluorescent lighting a high frequency current will provide a smoother light output while in electric blankets and other heating devices a high frequency current permits, inter alia, the usage of smaller and lighter weight electrical transformers. By rectifying the output of the current a smoothed DC voltage may be provided and which is easy to voltage regulate.

Two-core voltage inversion systems usually include one saturable transformer which is coupled to a pair of semiconductor switches to form an oscillatory circuit. The semiconductor switched voltages are coupled through a linear type transformer which in turn is connected to the saturable transformer. The output current us usually taken from the linear transformer. Such two-core voltage inversion systems have been built and are characterized as being of two types. A first type is a so-called current feedback type characterized in that when a short circuit is provided at the load it continues to operate and supply high circulating currents within the inverter. Under open circuit conditions the inverter becomes inoperative. It has been found that such inverters using the current feedback technique are difficult to start at low loads; i.e., high impedance loads or inductive loads.

A second type of voltage inverter is a so-called voltage feedback type. These inverters are characterized in that under short circuit load conditions the inverter becomes inoperative; i.e., because there is no voltage across the load the inverter cannot operate. Under open circuit conditions it will still operate and may provide destructive voltage conditions within the inverter. These inverters are difficult to start under full load; i.e., a low impedance load. However, at low loads, i.e., high load impedances, the voltage feedback inverter operates at a very low efficiency.

Accordingly, it is an object of the present invention to provide a voltage inverter which operates at a stable frequency irrespective of changes in source voltage or of load.

It is another object of this invention to provide a voltage inverter system which under open and short circuit conditions does not cause damage to the inverter and operates safely.

It is another object of this invention to provide a voltage inverter system which uses a blend of voltage and current feedback to provide a stably operating voltage inverter having high efficiency over wide range of load.

This invention is characterized in that two feedback loops are provided between first and second cores in the inverter. A first feedback loop provides feedback as a function of the load voltage while a second feedback loop provides feedback as a function of the load current. In such a magnetic oscillating system a desired blend of voltage and current feedback can be provided to obtain various operational results.

Referring now to the accompanying drawings, wherein.

According to this invention two transformers are interconnected with two electro-responsive switches, such as transistor semiconductive devices, to form an oscillatory circuit. One of the cores transformers has a saturable core to provide with the switches the periodicity of the oscillations. The second core transformer may have a core with linear hysteresis characteristics and provides electrical coupling to a load. It also serves as a feedback link to the saturable core transformer for sustaining oscillations. The feedback link includes connections of two types: one connection provides feedback to the switches in a proportion to the output current amplitude and is characterized by series electrical connection, while the second connection provides feedback to the switches in a proportion to the output voltage magnitude.

Figure 1:
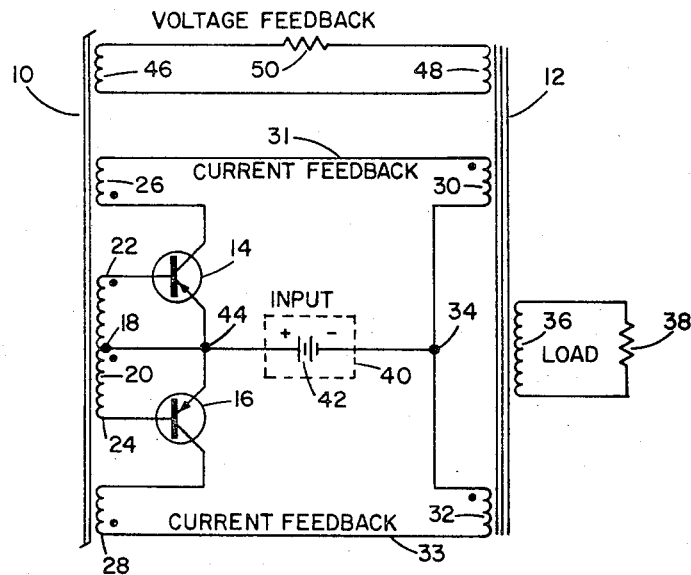
FIG. 1 is a schematic diagram showing a first embodiment of the subject invention utilizing separated voltage and current feedback loops.

Referring now to FIG. 1 there is shown a magnetic core 10 having the well known rectangular hysteresis loop characteristic and easily saturable in either of two magnetic polarities. A second core 12 preferably consists of magnetic material which is commonly found in linear transformers and therefore is characterized by having a so-called linear hysteresis characteristic. Core 12 need not be linear, but should not be operated to magnetic saturation. PNP transistor switches 14 and 16 have their emitters commonly connected together and thence to the center tap 18 of winding 20 wound on core 10. The opposite ends 22 and 24 of winding 20 are respectively connected to the control (base) electrodes of the PNP transistors 14 and 16. The collectors of the transistor switches 14 and 16 are serially coupled respectively through the current feedback windings 26 and 28 which are in turn magnetically coupled to core 10. The feedback current provided by this arrangement can be thought of as being in series relation to the transistors. The above described arrangement is known in the art and its operation is also well understood. Briefly, as transistor switch 14 begins to conduct current a voltage is induced in winding 26 and transferred to winding 20 to provide regenerative feedback such that transistor switch 14 rapidly switches between current conduction states. Transistor 16 operates together with windings 28 and 20 in a similar manner. It is to be understood that switches 14 and 16 can be either PNP, NPN or other semiconductor device structure, the important requirement is the switching action provided thereby. Accordingly, other connections such as common base and common collector may be also used.

The current feedback loops provided by this invention include the connections from windings 26 and 28 to windings 30 and 32, respectively which are magnetically linked to transformer core 12. Windings 30 and 32 are connected together as at 34 to form a single center-tapped winding. The current flowing through the windings 30 and 32 are respectively indicative of and directly related to the current flowing through output or load winding 36 connected to a suitable load 38. The current feedback loops supply current proportional to the output current to provide feedback drive to switches 14 and 16. The current feedback is respectively through windings 26, 28, thence winding 20 to the control electrodes of transistor switches 14 and 16.

Input means 40, which may consist of a battery 42, is connected between the center taps of windings 20 and 30–32, as at 34 and 44. Alternatively, other sources may be used to provide an input signal to the inverter system.

The voltage feedback loop includes winding 46 on core 10 and winding 48 on core 12 with current limiting resistor 50 serially coupled therebetween. The voltage feedback is supplied from windings 30 and 32 and transferred by transformer action to winding 48, and thence through the loop to winding 46. The resultant voltage across winding 46 is transformer coupled through the saturable core 10 to winding 20 for providing voltage between point 18 and the control electrodes of the two transistor switches 14 and 16. It should be noted that the voltage across winding 46 is directly related to the voltage across the load 38. The feedback drive to the base electrodes can be thought of as being supplied from across the transistors; i.e., in parallel. In the FIG. 1 illustrated circuit when load 38 provides an open circuit, there will be no current feedback to keep the inverter oscillating; the currents in windings 30 and 32 are minimal due to the high impedance presented by the open circuit. However, there will be substantial voltage thereacross and the voltage is fed back through core 10 via voltage feedback loop 46–48. Contrary-wise when load 38 is short circuited there is substantially no voltage provided across winding 36, thence no voltage feedback through winding 48. However, current will be maximum providing substantial current feedback through windings 26 and 28. Alternatively, winding 48 may be combined with windings 30 and 32 with voltage feedback being supplied from lines 31 and 33 through resistor 50 and winding 46.

It should be noted that the voltage feedback loop and the current feedback loop may be designed to co-act and limit the maximum current through transistor switches 14 and 16 due to the transformer action in cores 10 and 12. Therefore, the maximum current provided through winding 20 and the switches 14 and 16 can be limited by the voltage feedback loop during short circuit conditions. Also, the voltage developed in the inverter can be limited during open circuit conditions by the reduced current feedback co-acting with the winding 20 and switches 14 and 16.

Figure 2:
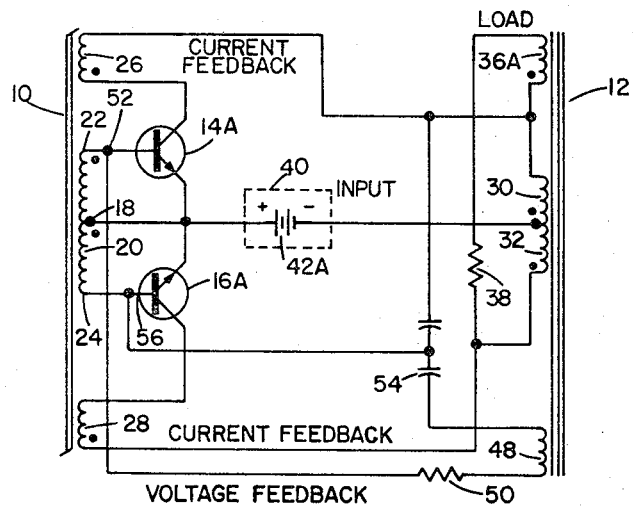
FIG. 2 is a schematic diagram illustrating a second embodiment of the subject invention utilizing a voltage feedback loop.

Referring now to FIG. 2, there is shown an inverter having the same characteristics as the FIG. 1 inverter, but with a different feedback arrangement. Those portions of the FIG. 2 circuit which correspond to the FIG. 1 circuit have the same numerals thereon. The transistors are shown as NPN rather than PNP and are labelled 14A and 16A, respectively. Also, battery 42 has been reversed and labelled battery 42A. Output winding 36A is also connected in an auto-transformer relationship to windings 30 and 32 with the load 38 connected between the winding 36A and winding 32.

The changed voltage feedback loop has winding 48 connected through resistor 50 to control electrode line 52 of transistor 14A. The other end of winding 48 is connected through a capacitor 54 to the control electrode line 56 of transistor 16A. The voltage induced in winding 48 is therefore impressed across the control electrodes of the two transistor switches. This latter circuit arrangement is useful where there is a wide range of load impedances required. That is, each time the inverter switches, a pulse of current from the booster circuit or voltage feedback loop, including winding 48, is injected at the base of the conducting transistor switch. This supplemental current adds to the base current from the feedback transformer 12 from the current feedback loops. At low load (load 38 has a high impedance) the current through winding 48 is adequate to provide oscillation of the inverter circuit. At full load (load 38 has a very low impedance) the current feedback loops provide a major portion of the oscillation driving current and the voltage feedback loop including winding 48 has little effect upon circuit operation. This arrangement has been found to be very useful with inductive loads wherein load current and associated current feedback build up slowly.

What is claimed is:

1. A two-core inverter system, including in combination,
    a first magnetic core having rectangular hysteresis characteristics,
    a second magnetic core,
    first and second electroresponsive switching means each having a control input and a pair of switch connections,
    a first center-tapped winding on said first core and having opposite ends connected respectively to the control inputs of said electroresponsive switches and having a center-tapped connection connected to one of the switch connections of each of said electroresponsive switches,
    a second center-tapped winding on said second core,
    input means connected between said center-tapped connections of said center-tapped windings,
    a pair of windings wound on said first core and respectively having one end connected to a switch connection on each of said electroresponsive switch means other than said one switch connection, and each having a second end,
    said second ends of said pair of windings connected to opposing ends of said second center-tapped winding such that current flowing in said second center-tapped winding also flows through said pair of windings for providing current feedback to the electroresponsive switch means and to said first core,
    and voltage feedback means comprising a voltage winding on said second core and circuit means including current limiting means intercoupling said voltage winding and said electroresponsive switch means such that current in said voltage winding is impressed between said control inputs of said first and second electroresponsive switch means,
    and an output winding connected to one end of said second center-tapped winding and a load means connected in series electrical circuit with said output winding and to an end of said center-tapped winding opposite said one end and said output winding being wound on said second core.

2. A two-core inverter system including in combination,
    a first magnetic core having rectangular hysteresis characteristics,
    a second magnetic core,
    first and second electroresponsive switch means each having a control input and a pair of switch connections,
    a first center-tapped winding on said first core having opposite ends connected respectively to said control inputs of said electroresponsive switch means and having a center-tapped connection connected to one of said switch connections of each of said electroresponsive switch means,
    a second center-tapped winding on said second core having a center-tapped and end connections, input means connected between said center-tapped connections of said center-tapped windings, current feedback means connected to the opposite ends of said second center-tapped winding and connected to the switch connections of said electroresponsive switch means for providing current feedback at second windings to said first windings through said first core, voltage feedback means including a winding on said second core and having circuit means connecting the last mentioned winding to said electroresponsive switch means, and an output winding connected to one end of said center-tapped winding and a load means connected in series of said output winding and to another end of second center-tapped winding and said output winding being wound on said second core.

References Cited

UNITED STATES PATENTS

| 3,085,211 | 4/1963 | Jensen et al. | 331—52 |
| 3,092,786 | 6/1963 | Bayne | 321—45 XR |
| 3,297,934 | 1/1967 | Massey | 321—2 |
| 3,308,397 | 3/1967 | Morgan | 321/45 XR |
| 3,320,510 | 5/1967 | Locklair | 321—2 |
| 3,344,362 | 9/1967 | Lingle | 321—2 XR |

LEE T. HIX, *Primary Examiner.*

W. M. SHOOP, *Assistant Examiner.*

U.S. Cl. X.R.

321—19, 45